July 30, 1946.  W. R. HARRY ET AL  2,404,799
SUBMARINE SIGNAL DEVICE
Filed July 3, 1942  2 Sheets-Sheet 1

INVENTORS: W. R. HARRY
F. F. ROMANOW
BY
Robert J. Pliskey
ATTORNEY

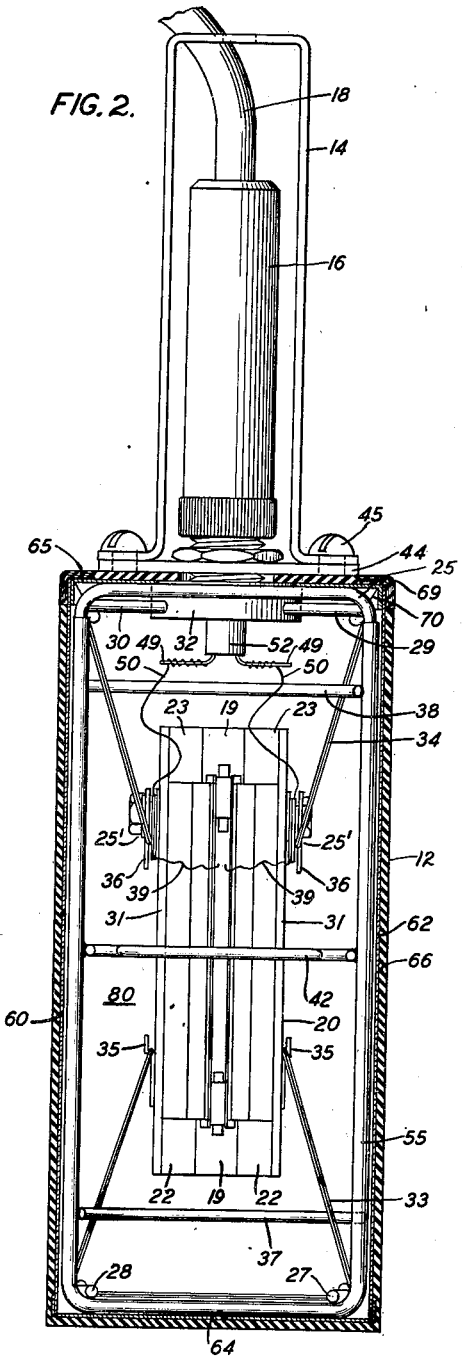
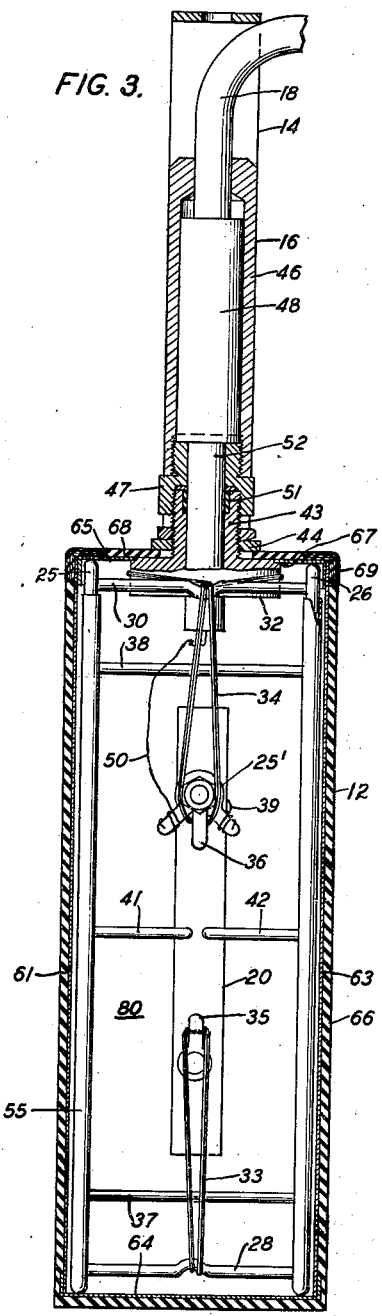
NOTE: SPACE 80 IS FILLED WITH PARTICLE-FREE, GAS BUBBLE-FREE, LOW-FREEZING POINT SOLUTION.
INVENTORS: W. R. HARRY
F. F. ROMANOW Patented July 30, 1946

2,404,799

UNITED STATES PATENT OFFICE 2,404,799

SUBMARINE SIGNAL DEVICE

William R. Harry, New York, N. Y., and Frank F. Romanow, Berkeley Heights, N. J., assignors to Bell Telephone Laboratories, Incorporated, New York, N. Y., a corporation of New York Application July 3, 1942, Serial No. 449,604

4 Claims. (Cl. 177—386)

This invention relates to submarine signal devices, and, more particularly, to submarine signal detectors or microphones.

Objects of this invention are to improve the structure and the operating characteristics of submarine signal devices, particularly pressure gradient type submarine signal detectors or microphones.

A pressure gradient submarine signal detector, microphone or unit may be of a construction such as is disclosed in applicants' copending application Serial No. 415,032, filed October 15, 1941. It has been observed that the mode of operation and the operating characteristics of such a device when submerged in a liquid medium, such as a river, lake or ocean, may be deleteriously affected by air or other gas bubbles in the medium that tend to accumulate on the surfaces of the unit and to introduce elastances or mechanical stiffnesses that alter the frequency response characteristic of the unit. Particles or objects of organic or inorganic origin present in the liquid medium may also seriously impede the proper functioning of the detector or damage it, particularly as a result of the entrance of particles between the magnet pole faces and the moving coil.

In accordance with this invention, the signal wave translating unit is resiliently suspended or supported within a substantially fluid-tight container substantially transparent to submarine signal waves or disturbances, the container being filled with a substantially particle-free, gas bubble-free liquid completely surrounding the translating unit. The container may be of thin sheet metal, such as brass, of uniform thickness, having a thin layer of soft rubber vulcanized to the external surfaces of the container. The translating unit may be resiliently supported by a plurality of elastic members, such as narrow rubber bands or strips, from and within an open frame of small cross section rigid wire. Those portions of the wire frame that are adjacent to or may make contact with the container have a thin layer of rubber vulcanized thereon. The frame and container are of substantially the same outer configuration, the frame making a loose sliding fit with the container when inserted therein. The liquid filling the container may comprise a solution or mixture having substantially the same density times velocity of wave propagation constant as that for the liquid medium in which the submarine signal detector is submerged. When the temperature of the medium is expected to fall below or to be below the freezing point, an antifreeze solution may constitute the container's liquid content and comprise a substantially particle-free, gas bubble-free solution of ethyl alcohol, glycerine and distilled water in volume proportions of 7½ per cent, 17½ per cent and 75 per cent, respectively.

A more complete understanding of this invention will be derived from the detailed description that follows, read with reference to the showing of the appended drawings wherein:

Fig. 2 and Fig. 3 are a front elevational view and a side elevational view, respectively, of the device of Fig. 1, each partly in section.

Figure 1:
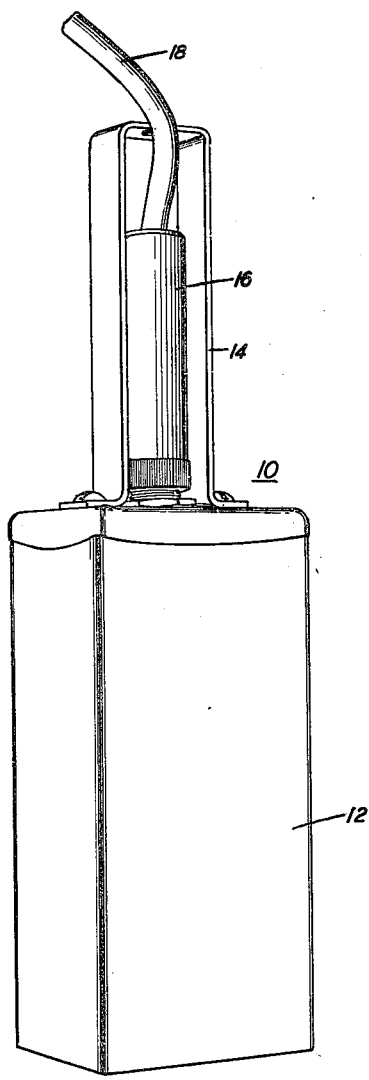
Fig. 1 is a view in perspective of a submarine signal device embodying the invention.

Fig. 1 is a perspective view of a submarine signal device 10 embodying the invention. This figure shows a substantially fluid-tight container or envelope 12; a bail 14 to which may be secured a suitable wire or other suspension (not shown) for supporting the unit when submerged in a liquid medium such as a river, lake or ocean through which signal waves or other disturbances to be detected are or may be propagated; and a fluid-tight stuffing box or gland 16 for an electrical cable 18 containing conductors or wires for connecting the device with suitable electrical translating equipment (not shown) that may be located in a boat from which the device might be suspended or on shore.

Figure 4:
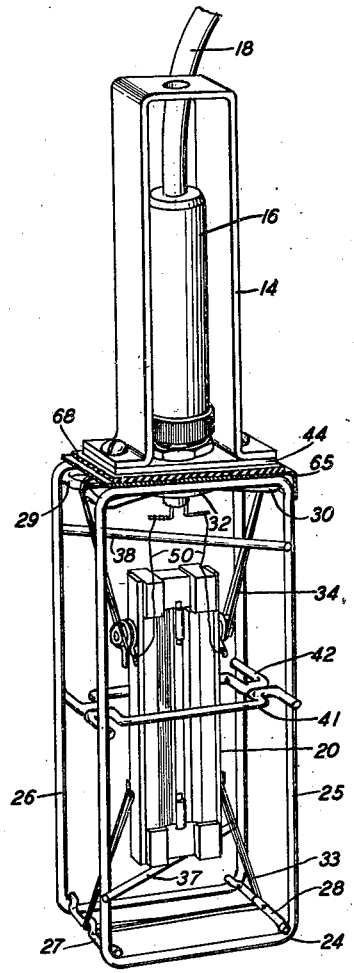
Fig. 4 shows the wire frame and translating unit assembly removed from the container of the device of Figs. 1 to 3.

Fig. 4 is a perspective of a portion of the device 10. A pressure gradient detector microphone or signal wave translating unit 20 (see Figs. 2 and 3 also) is resiliently supported from and centrally within a frame 24. The unit 20 may be substantially the same as that disclosed and claimed in applicants' copending application referred to above except that it is here preferred that the blocks or members 22, 23 be of reclaimed rubber; that the coil leads 39 be terminated at terminals 25' on the strips 31 instead of on terminals at the upper end of the unit; and that, as suggested in the aforesaid application, the magnet spacers 19 and strips 31 are soldered together where adjacent so as to constitute a unitary structure.

Frame 24 comprises a pair of elongated rectangular members 25, 26 formed from relatively rigid small-sectioned wire disposed in parallel relation and spaced apart at one pair of ends by separators 27, 28, the latter being soldered at their ends to the members 25, 26, and spaced apart at the other pair of ends by curved wire separators 29, 30, the latter being soldered to the members 25, 26 and to a centrally positioned flanged member 32.

The unit 20 is resiliently supported within the frame 24 by a plurality of elastic members 33, 34 which may comprise continuous flexible rubber bands or strips, for example, of the type in general use in offices. The strips 31 of the unit 20 may be provided with hooks or clips 35 over which the looped ends of the member 33 may be fitted, the stretched intermediate portion of the member 33 extending outwardly and downwardly from the unit 20 and over the separators 27, 28, appropriately located grooves, as shown, being provided in the latter. The terminals 25' may be constructed so as to include depending hook or clip portions 36 over which the looped ends of member 34 may be fitted, the stretched intermediate portion of the member 34 extending upwardly and outwardly from the unit 20 and over the separators 29, 30.

In order to limit the excursion of and to prevent damage to the unit 20 should the device 10 be subjected to excessively rough handling or shock, diagonal rigid wire members 37, 38 are disposed at appropriate distances above and below the unit, and additional rigid wire members 41, 42 surround the unit in spaced relation thereto. Hence, excessive motion of unit 20 either in the direction of its long dimension, or in directions at right angles thereto, is inhibited. Generally, the movement of the unit 20 in response to signal waves or disturbances in the water will be substantially less than the spacing between it and the buffer members 37, 38, 41, 42. As indicated in Figs. 2 and 3, the members 25, 26 have a thin layer 55 of rubber vulcanized onto substantially their entire surface area.

The member 32 has a central aperture and an upwardly extending exteriorly threaded flange 43. The elongated metallic plate 44 threadedly engages the flange 43, and the bail 14 is fastened to it by screws 45. The gland 16 comprises the sleeve 46 and coupler 47, and encloses the molded rubber member 48 that contains the soldered splice of the conductors (not shown) of the cable 13 and the conductors 49 to which connection is made by leads 50 from the terminals 25' of the unit 20. Gasket 51, clamped by coupler 47 about the dog 52 of the member 48, provides a watertight joint.

The container or envelope 12 will now be described with particular reference to Figs. 2 and 3. It comprises thin sheet metal of uniform thickness, such as .002 inch or .005 inch brass, constituting four substantially planar side walls 60, 61, 62, 63 and a pair of substantially planar end walls 64, 65. The marginal portions of the wall 64 are soldered to the lower edges of the walls 60 to 63, and the adjacent edges of the latter that are not integral are also soldered to provide fluid-tight joints. The external surfaces of the walls 60 to 64 have a thin layer 66 of rubber vulcanized thereon. This rubber layer may be of the order of $\tfrac{1}{16}$ inch. The top wall 65 contains a central aperture the marginal portion of which is soldered to the shoulder 67 on the member 32. The outer edges of the top wall are soldered to the upper edges of the walls 60 to 63. A thin layer of rubber 68 is vulcanized to the external surface of wall 65, covers the junction of the wall 65 and the member 32, and provides a substantially fluid-tight joint at such junction. The marginal perimeter 70 of the junction of walls 60 to 63 and 65 is overlapped with a water excluding tape or lagging 69. This portion is not rubber coated because, in the assembly of the device 10, a final step is to slide the frame 24 into the container portion constituted by the walls 60 to 64 and, thereafter, to solder the upper edges of the walls 60 to 63 to the edges of the wall 65. As already noted, the frame 24 makes a loose sliding fit with the container. The effect of any relative movement of frame and container that might bring them into contact and thereby generate undesired vibration that might be misinterpreted as a signal wave at the electrical translating equipment, is nullified by the rubber coating 55.

The space or chamber 80 defined by the container and not otherwise occupied by the unit 20, the frame 24 and the auxiliaries thereto, is filled with a substantially particle-free, gas bubble-free liquid; preferably one that will not react chemically with the container metal or the materials of the structure within the container, and preferably one that has substantially the same density times velocity of wave propagation constant as that for water. A submarine signal device including a liquid filling of these general characteristics is disclosed and claimed in A. H. Inglis application Serial No. 449,584, filed July 3, 1942, for Submarine signal device. A liquid having the non-corrosive and the transmission characteristics noted that has been determined to be satisfactory in the device 10 herein may comprise a solution or mixture of ethyl alcohol, glycerine and distilled water in the volume proportions of 7½ per cent, 17½ per cent and 75 per cent, respectively. Such solution has the additional desirable property of enabling the device 10 to be used in a liquid medium whose temperature may be or may fall below the freezing point, for example, of the order of about $-10°$ F. Such a solution and its specific application to a submarine signal device are disclosed and claimed in W. R. Harry application Serial No. 449,605, filed July 3, 1942, for Submarine signal device.

A satisfactory technique to be followed in assembling the device 10 so that the liquid contents thereof will meet the gas bubble-free requisite will now be described. As is predicated by the preceding description the mechanical assembly comprises two units: I. That portion of the container comprising the walls 60 to 64 with their external rubber coating; II. The rest of the device comprising the frame, the translating unit, the bail, the gland and the top wall 65.

The unit II, or so much of it as will be enclosed by the container 12, is immersed in a suitable receptacle, for example, a large beaker containing the ethyl alcohol-glycerine-distilled water particle-free solution or mixture. A syringe filled with the solution is utilized to blow all the air or other gas out of the spaces in the immersed structure, particularly from between the coil and the magnet. The units I and II are assembled in the solution. The assembly is removed from the solution and rendered fluid-tight by soldering together the adjacent edges of walls 60 to 63 and 65. At this stage, there will be a layer or film of air, perhaps of the order of ¼ or ⅜ inch, at the top wall of the chamber 80. A small hole or aperture is punched in the wall 65 and the assembly is placed in the evacuation chamber, for example, defined by a bell jar, of a gas evacuating system with a syringe connection to the aperture in the wall 65. The air in the bell jar is evacuated and the pressure reduced to a point at which the alcohol in the mixture might vaporize, and the space in chamber 80 formerly occupied by air or other gas is filled with the specified solution through the syringe. The hole is sealed and the device 10 is then ready for use in a liquid medium for submarine signaling purposes.

The container walls are quite thin and even at high frequencies, that is, up to at least 50,000 cycles per second, have no appreciable or measurable effects on the frequency response characteristic of the translating unit. The wall thickness is very small compared to the wavelengths involved. The rubber coating 66 has substantially the same density times velocity of wave propagation constant as that of the external liquid medium. The container walls 60 to 65 are flexible and might be considered to be diaphragms that transfer signal disturbances from the external liquid medium to the liquid contents of the device 10 and therethrough to the unit 20, the resultant relative movement of the coil and magnet structure of the latter translating the disturbance into an electric current to be transmitted over leads 39 and 50 and the cable 18 to the electrical translating equipment (not shown). The use of the thin metal provides protection against the diffusion of the external liquid medium and of air or other gas therein into the liquid contents of the device 10, against the diffusion of such liquid contents out into the external liquid medium, and against the access of organic or inorganic particles or objects in the external liquid medium to the translating unit 20. The external rubber coating protects the thin metal walls in the handling of the device, and affords some safeguard against objects in the liquid medium in which the device is submerged, as well as constituting a signal transmission layer of characteristics similar to that of the external liquid medium. The rubber coating also clamps or suppresses spurious vibration of the thin metal wall which otherwise might adversely affect the frequency response of the device.

Although this invention has been disclosed with reference to a particular embodiment thereof, it is apparent that its various features are susceptible of incorporation in physically dissimilar structures without departing from the spirit and scope of the invention.

What is claimed is:

1. A receiver of subaqueous sound waves comprising a pressure-gradient responsive electrical pick-up unit, a supporting box-like frame composed of upright and cross frame members rigidly secured together, means for resiliently suspending said unit within said frame in a central position so as to be spaced away from said frame on all sides, a fluid-tight container adapted to enclose said frame and unit, said frame having a sliding fit in said container, and a liquid filling all the remaining space in said container, the walls of said container being of yieldable construction and permitting free transfer of compressional waves from the water in which the receiver is immersed to the fluid within the container.

2. A receiver according to claim 1 comprising rubber or equivalent vibration damping material between all points of bearing between said frame and the interior of said container.

3. A receiver according to claim 1 in which the container wall thickness is small compared to the wavelength in water of the highest frequency sounds to be transmitted through the container.

4. A receiver according to claim 1 in which said container comprises laminated walls consisting of a metal sheet of from two to five thousandths inch in thickness overlaid with a thicker layer of resilient material having the wave propagating properties of flexible rubber.

WILLIAM R. HARRY.
FRANK F. ROMANOW.